United States Patent [19]
Gallagher

[11] Patent Number: 6,086,696
[45] Date of Patent: Jul. 11, 2000

[54] METHOD OF FORMING A SEAMLESS, CYLINDRICAL, THERMOPLASTIC STRUCTURE WITH A MULTIPLE COMPACTION ROLLER WINDER

[75] Inventor: Patrick Gallagher, Bainbridge Island, Wash.

[73] Assignee: The Boeing Company, Seattle, Wash.

[21] Appl. No.: 09/120,684

[22] Filed: Jul. 21, 1998

[51] Int. Cl.[7] .................................................. B65H 81/00
[52] U.S. Cl. .......................... 156/175; 156/169; 156/173; 156/184
[58] Field of Search .................................. 156/169, 172, 156/173, 175, 425, 429, 430, 184, 191

[56] References Cited

U.S. PATENT DOCUMENTS

| | | | |
|---|---|---|---|
| 2,467,999 | 4/1949 | Stephens | 156/169 X |
| 4,116,738 | 9/1978 | Pall . | |
| 4,125,423 | 11/1978 | Goldsworthy . | |
| 4,673,541 | 6/1987 | Watanabe et al. . | |
| 4,838,971 | 6/1989 | Cacak . | |
| 4,938,824 | 7/1990 | Youngkeit | 156/173 |
| 5,039,368 | 8/1991 | Gunyuzlu . | |
| 5,122,211 | 6/1992 | Roach . | |
| 5,123,990 | 6/1992 | Roach . | |
| 5,266,139 | 11/1993 | Yokota et al. . | |
| 5,447,586 | 9/1995 | Tam . | |
| 5,643,382 | 7/1997 | Delimoy et al. | 156/172 |

*Primary Examiner*—Jeff H. Aftergut
*Attorney, Agent, or Firm*—Christensen O'Connor Johnson & Kindness PLLC

[57] ABSTRACT

A method and apparatus utilizes a multiple compaction roller ring winder (10) to consolidate multiple tapes of thermoplastic material (34) through conductive heat transfer to form approximately cylindrical structures. This includes rotating a driven mandrel (20) about an axis (24) to present a rotating forming surface. A plurality of material supply reels (30) disperse multiple thermoplastic material tapes (34). The supply reels (30) are positioned around the mandrel (20) such that the thermoplastic tapes (34) are simultaneously wrapped around the forming surface of the mandrel (20) to provide the material for the cylindrical structure. The multiple tapes (34) are compacted against the forming surface of the mandrel (20) by a plurality of heatable compaction rollers (40) that are positioned to rotate and press the tapes (34). The thermoplastic tapes (34) are heated through conduction with the heatable compaction rollers (40) to a temperature sufficient to consolidate the multiple tapes (34) approximately simultaneously with the addition of the thermoplastic tapes (34) to the cylindrical structure being formed.

15 Claims, 2 Drawing Sheets

METHOD OF FORMING A SEAMLESS, CYLINDRICAL, THERMOPLASTIC STRUCTURE WITH A MULTIPLE COMPACTION ROLLER WINDER

FIELD OF THE INVENTION

The present invention relates to a method and apparatus for forming thermoplastic ring structures, and more particularly to a method and apparatus that utilize multiple compaction rollers to wind and form thermoplastic ring structures.

BACKGROUND OF THE INVENTION

In the past, most composite ring structures have been manufactured using thermoset materials. When thermoset composite materials are used to produce a ring-type structure, the entire ring must be cured in an autoclave at a temperature that is suitable to bring the material to its final solidified state. During the autoclave process, the fibers within the thermoset material have a tendency to relax and lose alignment in the structure. The relaxation of these fibers is an undesirable event, since it is well known in the aft that fiber alignment significantly affects the strength and stiffness of a composite structure.

The processing of thermoplastic composite materials to form these types of ring structures, requires a very different type of machine and process than that utilized with thermoset materials. Several distinct advantages can be derived from the use of thermoplastic composite materials to produce structures such as cylindrical rings. Specifically, when compaction and consolidation of a thermoplastic composite material occur at the moment that the new material is added to the ring structure, as in a winding operation, the fibers in the matrix of the thermoplastic material are locked into whatever shape is given to those fibers at the moment of compaction and consolidation. As previously mentioned, locking the fibers in the matrix of a composite material into alignment significantly increases the strength and stiffness of the resulting composite structure.

However, most of the work that has been done in the area of manufacturing ring structures from thermoplastic materials, has focused on using convection heating to bring the thermoplastic materials to a temperature at which consolidation of the material can occur. Convection heating was introduced into the art of thermoplastic ring formation several years ago, to increase the speeds that can be achieved during ring formation. It was well known in the art that heat transfer through radiation and conduction could not introduce enough thermal energy into the thermoplastic material product to cause consolidation of the material at a rate faster than 1 to 2 inches per second. This type of rate refers to the speed at which new thermoplastic composite tape material is added to the old thermoplastic composite tape material in the ring structure being formed. Convection heat transfer is achieved by blowing hot gas onto the thermoplastic composite tape at the point where the new thermoplastic composite tape comes into contact with the old thermoplastic composite tape material of the winding ring structure being formed, causing melting of the material so that the new and old thermoplastic material combine into one solid mass.

Convection heat transfer, however, is undesirable in several respects, one of which being that it is extremely inefficient. Only a small proportion of the heat that is generated is actually used to heat the thermoplastic composite material. The majority of the generated heat blows about the vicinity of the impinging jets, heating the machine, bearings, spindles, and remaining structure. An additional disadvantage is that convection heating cannot heat the one place that it is intended to heat, the contact point of the new thermoplastic tape material that is being introduced with the old thermoplastic tape material in the wound ring, because the blowing gas stagnates at the acute angle between the introduced tape material and the wound ring. Stagnated convective heat has no velocity and therefore cannot transfer heat.

Additional problems are also encountered when winding a thick ring structure from thermoplastic composite materials. To form thick ring structures, larger amounts of thermoplastic material are required. This can be achieved by splicing several relatively short runs of thermoplastic tape material together. However, splices in the incoming material present discontinuities into the structure, thus lowering the mechanical properties of the product that is formed. Alternatively, a single extremely long run of thermoplastic tape material can be used to wind a thick ring structure, thus eliminating splices from the final product. The problem with this technique is that it is extremely expensive to have thermoplastic tape material manufactured which is several thousand feet long and that contains no splices. Several other cumbersome schemes have been contrived without success that attempted to splice material on the fly, or utilized a type of start and stop consolidation technique.

Thus, there is a continuing need in the art of thermoplastic ring formation, of a method and apparatus for winding ring structures (particularly thick ring structures) that is relatively inexpensive and can achieve high rates of manufacturing speed while utilizing conduction heat transfer to achieve consolidation of the thermoplastic material.

SUMMARY OF THE INVENTION

The present invention is directed towards a method for forming seamless, approximately cylindrical structures from thermoplastic composite material utilizing multiple compaction rollers to consolidate multiple tapes (also referred to as rovings or ribbons) of thermoplastic material through conductive heat transfer. The method includes rotating a mandrel about an axis to present a rotating forming surface for manufacturing a cylindrical structure. A plurality of tapes of thermoplastic composite material are dispersed from multiple supply reels positioned around the mandrel and simultaneously wrapped around the forming surface of the mandrel. The multiple tapes of thermoplastic composite material are then compacted against the forming surface of the mandrel by a plurality of compaction rollers that are positioned to rotate and press the thermoplastic material against the forming surface of the mandrel. Lastly, the thermoplastic composite material tapes are heated to consolidate the multiple tapes of thermoplastic composite material approximately simultaneously with the addition of the thermoplastic composite material to the cylindrical structure that is being formed.

In a preferred method of the present invention, a mandrel is actuated that has a substantially horizontal rotational axis. Further, in this ring winding method there are at least three compaction rollers utilized, that are approximately equally spaced along the circumferential outer forming surface of the mandrel. These compaction rollers are heated to a temperature sufficient to consolidate the new tapes of thermoplastic material being added to the cylindrical structure by conductive heat transfer, as the tapes of material are compacted into the cylindrical structure being formed. Due to the temperature of the heated compaction rollers, the compaction rollers are urged into contact with the incoming tapes of thermoplastic material by backup wheels. At least two pair of spaced-apart backup wheels, which are temperature controlled, act in rolling engagement with each heated compaction roller. The method of placing multiple equally spaced, heated compaction rollers along the outer surface of the thermoplastic cylindrical structure being formed, maintains the temperature of the outer surface of the thermoplastic material above the glass transition temperature, thus minimizing thermal gradients around the periphery of the formed part.

In an alternate embodiment of the present invention, a multiple compaction roller ring winder apparatus is utilized for forming seamless, approximately cylindrical structures from thermoplastic composite material through conductive heat transfer. The multiple compaction roller apparatus contains a mandrel that has a rotational axis and an exterior forming surface. The apparatus further includes a plurality of material supply reels that dispense multiple tapes of thermoplastic material for simultaneously wrapping around the forming surface of the mandrel, in order to produce an approximately cylindrical structure. A plurality of heatable compaction rollers are positioned adjacent to the forming surface of the mandrel in this alternate apparatus of the present invention, such that the rollers rotate and adjustably compact the thermoplastic material against the forming surface. These heatable compaction rollers consolidate the multiple tapes of thermoplastic material primarily through conductive heat transfer at approximately the contact point of the thermoplastic material with the heatable compaction rollers, in order to approximately simultaneously consolidate and compact the thermoplastic material of the cylindrical structure being formed.

A multiple consolidation roller ring winder constructed in accordance with the present invention, and a method of forming thereof can be produced or implemented to derive many advantages over the methods and devices disclosed in the prior art. The present invention utilizes conductive heat transfer to jointly compact and consolidate a thermoplastic ring structure, thus locking the material fibers into alignment and enhancing the mechanical properties of the structure formed. The simultaneous wrapping of multiple tapes of thermoplastic material around a mandrel forming surface and joint compaction/consolidation of the multiple tapes by a plurality of heated compaction rollers, allows thick cylindrical structures to be manufactured without splices, far less expensively and much more rapidly than ever before achievable using conductive heat transfer consolidation techniques. Finally, utilizing a plurality of equally spaced, heated compaction rollers minimizes the thermal gradients and stresses in the thermoplastic material of the structure formed, thus, reducing internal fracturing and leading to superior part quality.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
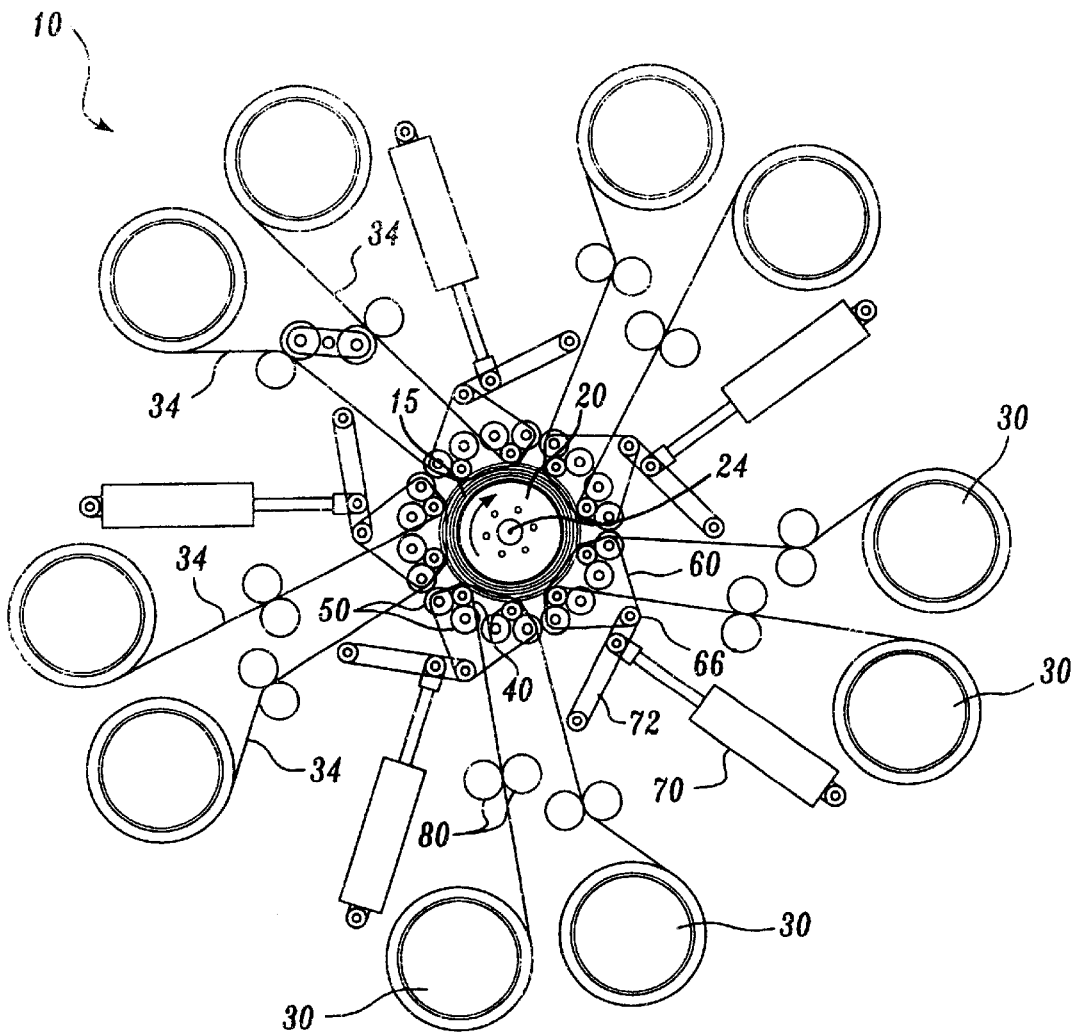
FIG. 1 illustrates a side view of a multiple compaction roller ring winder of the present invention, utilizing ten material supply reels, ten heatable compaction rollers, and twenty pairs of spaced-apart backup wheels.

According to a preferred method of the present invention as shown in FIG. 1, approximately cylindrical structures are formed from thermoplastic composite tape material utilizing multiple compaction rollers to consolidate multiple tapes of thermoplastic material through conductive heat transfer. The method can be performed using a multiple compaction roller ring winder 10 to produce seamless, approximately cylindrical-shaped laminate structures 15. As shown in FIG. 1, the method includes rotating a driven mandrel 20 about an axis 24, by way of an electrical or otherwise powered mechanism, to present a rotating forming surface on the circumferential exterior of the mandrel for manufacturing a cylindrical laminate structure 15. A plurality of material supply reels 30 disperse multiple thermoplastic material tapes 34. The supply reels 30 are positioned around the mandrel 20 such that the thermoplastic tapes 34 can be simultaneously wrapped around the forming surface of the driven mandrel 20, thereby providing the material for the formation of the cylindrical laminate structure 15.

The multiple thermoplastic material tapes 34 are compacted against the forming surface of the mandrel 20 by a plurality of heatable compaction rollers 40 that are positioned to rotate and press the thermoplastic tapes 34 against the forming laminate structure 15 on the surface of the mandrel 20. The thermoplastic material tapes 34 are heated through conduction with the heatable compaction rollers 40 to a temperature sufficient to consolidate the multiple tapes 34 approximately simultaneously with the addition of the thermoplastic material tapes 34 to the forming laminate structure 15. Pairs of spaced-apart backup wheels 50 are rollably mounted between spaced-apart, generally polygon-shaped sandwich plates 60 and selectively rotatably engage the heatable compaction rollers 40. The spaced-apart sandwich plates 60 are joined together via connecting links 66 and are further operatively connected to a loading system 70 by way of an actuator arm 72. Tensioning rollers 80 are also utilized to frictionally restrain each thermoplastic tape 34 to be taut prior to compaction and consolidation by a heatable compaction roller 40 into the previously compacted and consolidated thermoplastic tapes 34 in the forming laminate structure 15.

The method of the present invention, which employs a multiple compaction roller ring winder 10 shown in FIG. 1, centers around a rotating forming element such as a driven mandrel 20. In a preferred method, the rotational axis 24 of the driven mandrel 20 lies substantially in a horizontal plane. This rotational orientation is preferred because the thermoplastic material tapes 34 are heated to a consolidation temperature by the heatable compaction rollers 40, thus causing the resins within the thermoplastic material to be in a viscous molten state. If the rotational axis 24 of the driven mandrel 20 were oriented in a substantially vertical configuration, the semi-molten thermoplastic material tapes 34 would have a tendency to flow axially due to gravity, towards the lower end of the cylindrical structure being formed and produce a misshapen final product.

As illustrated in FIG. 1, numerous thermoplastic material supply reels 30 are positioned generally around the periphery of the multiple compaction roller ring winder 10. Preferably, each supply reel 30 dispenses an individual tape 34 of thermoplastic material. In the method of one exemplary technique, the number of supply reels 30, and the thus the number of thermoplastic material tapes 34, equals the number of heatable compaction rollers 40. Therefore, in the above example, each individual thermoplastic tape 34 is compacted and consolidated into the forming thermoplastic cylindrical laminate structure 15 by its own heatable compaction roller 40. This technique of introducing new thermoplastic material tapes 34 simultaneously, at numerous locations spaced about the circumference of the mandrel 20, produces a number of desirable advantages.

Typical prior art compaction roller winding techniques have utilized only a single compaction roller and single incoming tape of thermoplastic material. Thus, the winding of a thick ring structure required either an exceedingly long thermoplastic tape or a number of shorter thermoplastic tapes that were consecutively spliced together in an end-to-end butt splice configuration. However, extremely long thermoplastic tapes are also extremely expensive, and splicing shorter thermoplastic tapes together end-to-end creates discontinuities in the structure which reduce the mechanical properties of the part. Additionally, the process of consolidation through compaction and conductive heat transfer, while providing desirable part quality, is also quite time consuming, currently having a maximum consolidation rate of 1 to 2 inches of new thermoplastic tape material per second.

When utilizing the method of the present invention, where numerous tapes of thermoplastic material 34 are introduced onto a forming surface simultaneously, each individual thermoplastic tape 34 need only be but a fraction of the total length of the thermoplastic tape material that would otherwise be required. (E.g., thus if 3,000 feet of thermoplastic material were needed to produce a ring of a particular thickness, and ten supply reels 30 of thermoplastic tape 34 were utilized, then each reel of tape would only need to be 300 feet long.) Furthermore, since many times as much material (ten times as much in the above example) is being introduced in the same amount of time, this process is many times faster (ten times faster in the above example) than a process utilizing a single compaction roller and introducing a single tape of thermoplastic material at a time.

The method of the present invention utilizes multiple compaction rollers 40 that are spaced equidistantly around the circumference of the mandrel 20. Preferably, a minimum of three compact rollers 40 are positioned around the periphery of the mandrel 20 such that the compaction rollers 40 can selectively rollably engage the thermoplastic tapes 34 which are wrapped around the mandrel 20 during the forming of a cylindrical laminate structure 15. The minimum of three equally spaced compaction rollers 40 allows secured, self-aligning contact with the mandrel 20 to be achieved. Maximizing the number of equally spaced compaction rollers 40 to the largest feasible number, based upon the size of the cylindrical structures being formed, will usually optimize this process. For example, FIG. 1 illustrates a forming configuration utilizing ten compaction rollers 40 positioned around the exterior of the mandrel 20.

Each compaction roller 40 is sufficiently heated so that the roller melts and consolidates the incoming thermoplastic material tape 34 which it contacts through conductive heat transfer as the thermoplastic tape 34 is compacted into the forming cylindrical laminate structure 15. When, as in this method, compaction and consolidation occur at the moment that new thermoplastic material is added to the cylindrical structure, the fibers in the matrix of the thermoplastic material are locked into alignment, thus increasing the mechanical properties of the final structure. Another benefit of this multiple thermoplastic tape, multiple compaction roller 40 forming method over prior art single roller techniques is the increased control of the temperature of the cylindrical structure during the winding formation process.

A single heated compaction roller contacts only one place on the forming laminate structure 15 where it introduces conductive heat. As the molten thermoplastic material leaves the roller, it begins to cool. If the thermoplastic material cools too quickly, thermal stresses can rupture the material. The thermoplastic material does not truly solidify until it falls below the material-specific glass transition temperature (which is below the melt temperature). If the thermoplastic material falls beneath the glass transition temperature too quickly, the material may crack. Accordingly, thermal gradients exist in the manufactured part as a function of the circumferential distance from the heated compaction roller and as a function of the depth into the thermoplastic part, radially inward towards the center of the ring.

By implementing numerous compaction rollers 40 equally dispersed about the circumference of the mandrel 20, as taught by the method of the present invention, the temperature gradients entering and leaving the heated compaction rollers 40 are small, and control of the glass transition temperature in the thermoplastic material occurs substantially as a function of the depth (radial thickness) of the cylindrical laminate structure 15. Thus, the process of consolidation, locking the fibers of the thermoplastic material into alignment, is controlled uniformly about the cylindrical laminate structure 15 simultaneously, thereby leading to cylindrical parts of superior structural quality.

Figure 2:
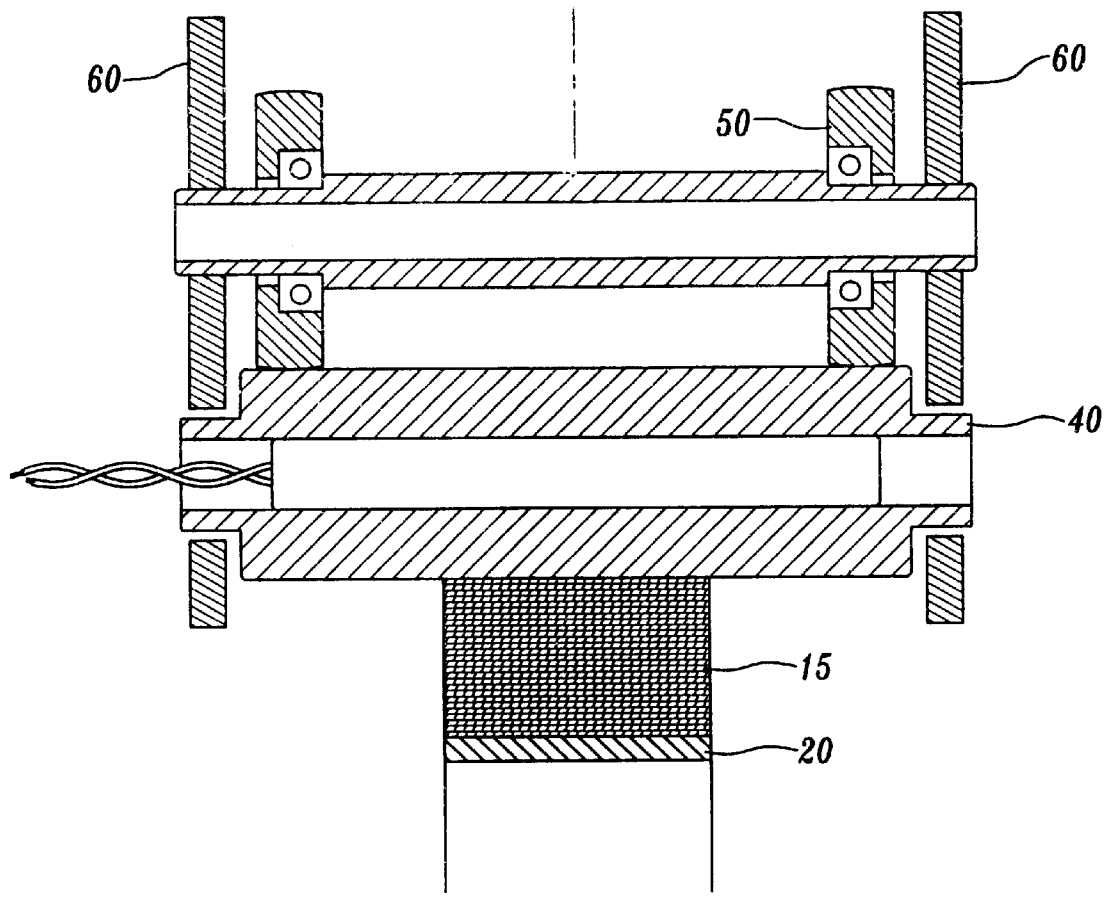
FIG. 2 illustrates a partial cross-sectional view of the multiple compaction roller ring winder of FIG. 1, focusing on the mandrel, a compaction roller, a pair of backup wheels, and a pair of spaced-apart sandwich plates.

Due to the temperature to which the compaction rollers 40 are heated, implementing a technique for moving the rollers 40 into engagement with the structure being formed, that does not experience rapid degradation due to the extreme heat can be difficult to achieve. This invention takes advantage of spaced-apart backup wheels 50 (as shown in FIG. 2) which are selectively positionable, to urge the heated compaction rollers 40 into contact with the forming laminate structure 15 against the outer forming surface of the rotary mandrel 20. Preferably, at least two pairs of spaced-apart backup wheels 50 per heated compaction roller 40 are used, so that each heated compaction roller 40 can be rotatably secured between the two pairs of backup wheels 50 and the contact point with the entering thermoplastic tape 34 during the forming process. As shown in FIG. 2, these backup wheels 50 are temperature controlled, typically with water, so that the backup wheels 50 do not have the heat deterioration concerns of the compaction rollers 40.

One exemplary method for urging the backup wheels 50, and hence the heated compaction rollers 40, towards the mandrel 20, is to rotatably secure the backup wheels 50 between spaced-apart sandwich plates 60 on either end of the backup wheels 50. Each pair of spaced-apart sandwich plates 60 can then be secured to each other by one or more connecting links 66. This entire sandwich plate assembly can then be moved towards and away from the mandrel 20 by a loading system, such as a actuator 70, via an actuator arm 72.

During a proper compaction and consolidation process it is also desirable to assure that incoming thermoplastic tapes 34 are in a state of tension as the tapes 34 approach the compaction rollers 40. To produce taut entering thermoplastic tapes 34, tensioning rollers 80 are preferably utilized, which frictionally restrain the tapes 34 at a point after they leave the supply reels 30 but before the tapes 34 reach the compaction rollers 40. As shown in FIG. 1, one possible fictionally restraining method involves guiding the thermoplastic tapes 34 between a pair of juxtapositioned tensioning rollers 80.

An alternate embodiment of the present invention teaches a multiple compaction roller ring winder apparatus 10, a preferred embodiment of which is shown in FIG. 1. A preferred embodiment multiple compaction roller apparatus 10, contains the structural elements that were described above in relation to the afore-depicted forming method.

The present invention has been described in relation to a preferred method and an alternate preferred apparatus embodiment. One of ordinary skill, after reading the foregoing specification, may be able to affect various other changes, alterations, and substitutions or equivalents thereof without departing from the concepts disclosed. It is therefore intended that the scope of the Letters Patent granted hereon be limited only by the definitions contained in the appended claims and equivalents thereof.

The embodiments of the invention in which an exclusive property or privilege is claimed are defined as follows:

1. A method for forming seamless, approximately cylindrical structures from thermoplastic composite material, the method comprising:

(a) rotating a mandrel about an axis to present a rotating forming surface;

(b) simultaneously wrapping a plurality of tapes of thermoplastic composite material dispersed from supply reels around the forming surface of the mandrel to form the approximately cylindrical structure;

(c) compacting the tapes of thermoplastic composite material against the forming surface of the mandrel with a plurality of compaction rollers that are positioned to rotate and press the thermoplastic composite material against the forming surface of the mandrel; and (d) conductively heating the thermoplastic composite material tapes through conductive contact with the compaction rollers to consolidate the multiple tapes of thermoplastic composite material approximately simultaneously with the compaction of the thermoplastic composite material to the approximately cylindrical structure being formed.

2. The method of claim 1, wherein said plurality of compaction rollers are approximately equally spaced along the circumferential outer forming surface of the mandrel.

3. The method of claim 1, wherein the thermoplastic composite material is heated to a consolidation temperature substantially only through the heat transfer mode of conduction.

4. The method of claim 1, wherein the temperature of the thermoplastic composite material on the outer circumferential surface of the approximately cylindrical configured structure being formed is maintained above the glass transition temperature of the thermoplastic composite material by the plurality of heated compaction rollers.

5. The method of claim 1, wherein the rotational axis of the mandrel is substantially horizontal.

6. The method of claim 1, wherein at least three heated compaction rollers are utilized.

7. The method of claim 1, wherein at least two pair of spaced-apart backup wheels are in rolling contact with each heated compaction roller and urge the heated compaction rollers into contact with the thermoplastic composite material at the contact point, against the forming surface of the mandrel.

8. The method of claim 7, wherein the backup wheels are temperature controlled.

9. The method of claim 8, wherein the backup wheels are temperature cooled with water.

10. The method of claim 7, wherein the backup wheels are mounted between spaced apart sandwich plates.

11. The method of claim 10, wherein the heated compaction rollers are operatively associated with the spaced apart sandwich plates.

12. The method of claim 10, wherein a loading system urges the heated compaction rollers towards the forming surface of the mandrel against the thermoplastic composite material at a desirable level of force.

13. The method of claim 12, wherein the loading system includes an actuator coupled to the spaced apart sandwich plates.

14. The method of claim 1, wherein the multiple tapes of thermoplastic composite material from the supply reels are frictionally restrained to be taut by tensioning rollers for consolidation into the approximately cylindrical structure.

15. A method for forming seamless, cylindrical structures from thermoplastic composite material, the method comprising:

(a) rotating a mandrel about a horizontal axis to present a rotating forming surface;

(b) simultaneously wrapping a plurality of tapes of thermoplastic composite material dispersed from supply reels around the forming surface of the mandrel to form the cylindrical structure;

(c) compacting the tapes of thermoplastic composite material against the forming surface of the mandrel with at least three substantially equally spaced heated compaction rollers that are positioned to rotate and press the thermoplastic composite material against the forming surface of the mandrel; and (d) conductively heating the thermoplastic composite material tapes through conductive heat transfer with the heated compaction rollers to consolidate the multiple tapes of thermoplastic composite material approximately simultaneously with the compaction of the thermoplastic composite material to the cylindrical structure being formed.

* * * * *

UNITED STATES PATENT AND TRADEMARK OFFICE
CERTIFICATE OF CORRECTION

PATENT NO. : 6,086,696
DATED : July 11, 2000
INVENTOR(S) : P. Gallagher

It is certified that error appears in the above-identified patent and that said Letters Patent is hereby corrected as shown below:

COLUMN     LINE

8              5              "pair" should read --pairs--
(Claim 7,   line 1)

Signed and Sealed this

Fifteenth Day of May, 2001

Attest:

NICHOLAS P. GODICI

Attesting Officer        Acting Director of the United States Patent and Trademark Office